(12) United States Patent
Lazaridis et al.

(10) Patent No.: US 9,766,718 B2
(45) Date of Patent: *Sep. 19, 2017

(54) ELECTRONIC DEVICE AND METHOD OF DISPLAYING INFORMATION IN RESPONSE TO INPUT

(75) Inventors: Mihal Lazaridis, Waterloo (CA); David Paul Yach, Waterloo (CA); Donald James Lindsay, Mountain View, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 36 days.

This patent is subject to a terminal disclaimer.

(21) Appl. No.: 13/036,186

(22) Filed: Feb. 28, 2011

(65) Prior Publication Data
US 2012/0218192 A1   Aug. 30, 2012

(51) Int. Cl.
| | |
|---|---|
| *G06F 3/041* | (2006.01) |
| *G06F 3/0338* | (2013.01) |
| *G06F 1/16* | (2006.01) |
| *G06F 3/01* | (2006.01) |
| *G06F 3/02* | (2006.01) |
| *G06F 3/0488* | (2013.01) |
| *H04M 1/2745* | (2006.01) |

(52) U.S. Cl.
CPC .......... *G06F 3/0338* (2013.01); *G06F 1/1626* (2013.01); *G06F 3/016* (2013.01); *G06F 3/0202* (2013.01); *G06F 3/0414* (2013.01); *G06F 3/04883* (2013.01); *H04M 1/274525* (2013.01)

(58) Field of Classification Search
CPC ...... G06F 3/0338; G06F 1/1626; G06F 3/016; G06F 3/0202; G06F 3/0414; G06F 3/04883; H04M 1/274525

USPC ........................................................ 715/863
See application file for complete search history.

(56) References Cited

U.S. PATENT DOCUMENTS

| | | |
|---|---|---|
| 5,305,435 A | 4/1994 | Bronson |
| 5,570,109 A | 10/1996 | Jenson |
| 5,651,107 A | 7/1997 | Frank et al. |
| 5,668,960 A | 9/1997 | Kataoka |
| 6,073,109 A | 6/2000 | Flores et al. |
| 6,133,898 A | 10/2000 | Ludolph et al. |
| 6,333,973 B1 | 12/2001 | Smith et al. |
| 6,584,181 B1 | 6/2003 | Aktas et al. |
| 7,079,160 B2 * | 7/2006 | Colavin ........................ 345/684 |

(Continued)

FOREIGN PATENT DOCUMENTS

| | | |
|---|---|---|
| CN | 1834887 | 9/2006 |
| CN | 101692194 | 4/2010 |

(Continued)

OTHER PUBLICATIONS

Extended European Search Report for EP Application No. 11156282.3, dated Jul. 27, 2011, 7 pages.

(Continued)

*Primary Examiner* — Jung-Mu Chuang
(74) *Attorney, Agent, or Firm* — Fish & Richardson P.C.

(57) ABSTRACT

A method includes displaying, in a window or field, first information associated with a first source running on a portable electronic device and detecting an input to display second information associated with a second source. After the detecting, second information associated with the second source and the first information in the window or field is displayed.

11 Claims, 6 Drawing Sheets

(56) References Cited

U.S. PATENT DOCUMENTS

| | | | |
|---|---|---|---|
| 7,190,976 B2* | 3/2007 | Enns | G06F 17/30905 455/566 |
| 7,250,955 B1 | 7/2007 | Beeman et al. | |
| 7,283,808 B2 | 10/2007 | Castell et al. | |
| 7,308,653 B2* | 12/2007 | Lin-Hendel | 715/785 |
| 7,370,284 B2* | 5/2008 | Andrea et al. | 715/788 |
| 7,385,875 B2 | 6/2008 | May et al. | |
| 7,430,409 B2 | 9/2008 | Klassen et al. | |
| 7,484,213 B2 | 1/2009 | Mathew et al. | |
| 7,539,945 B2 | 5/2009 | Conrad et al. | |
| 7,642,901 B2 | 1/2010 | Kato et al. | |
| 7,647,559 B2 | 1/2010 | Yozell-Epstein et al. | |
| 7,752,279 B2 | 7/2010 | Hardy et al. | |
| 7,774,418 B2 | 8/2010 | Tang et al. | |
| 7,782,307 B2 | 8/2010 | Westerman et al. | |
| 7,802,206 B1 | 9/2010 | Davis et al. | |
| 7,809,162 B2 | 10/2010 | Steinberg et al. | |
| 7,812,828 B2 | 10/2010 | Westerman et al. | |
| 7,812,860 B2 | 10/2010 | King et al. | |
| 7,826,641 B2 | 11/2010 | Mandella et al. | |
| 7,844,076 B2 | 11/2010 | Corcoran et al. | |
| 7,844,915 B2* | 11/2010 | Platzer et al. | 715/781 |
| 7,848,549 B2 | 12/2010 | Steinberg et al. | |
| 7,860,274 B2 | 12/2010 | Steinberg et al. | |
| 7,861,169 B2 | 12/2010 | Hull et al. | |
| 7,865,562 B2* | 1/2011 | Nesbitt | G06F 17/24 709/206 |
| 7,884,846 B2 | 2/2011 | Ferren et al. | |
| 7,899,915 B2 | 3/2011 | Reisman | |
| 7,900,074 B2 | 3/2011 | Reece et al. | |
| 7,904,828 B2 | 3/2011 | Conrad et al. | |
| 7,937,672 B2* | 5/2011 | Casto | 715/830 |
| 7,996,045 B1* | 8/2011 | Bauer et al. | 455/566 |
| 8,032,482 B2 | 10/2011 | Rosenberg et al. | |
| 8,032,597 B2 | 10/2011 | Khoo | |
| 8,082,518 B2* | 12/2011 | Flake et al. | 715/786 |
| 8,099,681 B2* | 1/2012 | Flanagan et al. | 715/853 |
| 8,122,364 B2 | 2/2012 | Yozell-Epstein et al. | |
| 8,134,727 B1 | 3/2012 | Shmunis et al. | |
| 8,140,115 B1 | 3/2012 | Kahn et al. | |
| 8,140,975 B2 | 3/2012 | Lemay et al. | |
| 8,176,411 B2 | 5/2012 | Palmieri | |
| 8,205,234 B1* | 6/2012 | Eguchi | G11B 20/10 725/105 |
| 8,224,391 B2 | 7/2012 | Kim et al. | |
| 8,237,664 B2* | 8/2012 | Swanbufg et al. | 345/173 |
| 8,239,785 B2 | 8/2012 | Hinckley et al. | |
| 8,249,664 B1 | 8/2012 | Bauer et al. | |
| 8,253,695 B2 | 8/2012 | Ganatra et al. | |
| 8,261,213 B2 | 9/2012 | Hinckley et al. | |
| 8,271,660 B2 | 9/2012 | Schulzrinne et al. | |
| 8,271,907 B2* | 9/2012 | Kim et al. | 715/863 |
| 8,280,962 B2 | 10/2012 | Muniz et al. | |
| 8,291,344 B2 | 10/2012 | Chaudhri | |
| 8,296,332 B2 | 10/2012 | Boley et al. | |
| 8,300,005 B2 | 10/2012 | Tateuchi et al. | |
| 8,301,701 B2 | 10/2012 | Goodman et al. | |
| 8,356,256 B2 | 1/2013 | Olsen | |
| 8,359,017 B2 | 1/2013 | Bruchelt | |
| 8,359,335 B2 | 1/2013 | Coker et al. | |
| 8,392,837 B2 | 3/2013 | Li | |
| 8,402,384 B2 | 3/2013 | Scott | |
| 8,453,057 B2 | 5/2013 | Stallings et al. | |
| 8,473,843 B2 | 6/2013 | Lundy et al. | |
| 8,473,870 B2 | 6/2013 | Hinckley et al. | |
| 8,479,122 B2 | 7/2013 | Hotelling et al. | |
| 8,510,677 B2 | 8/2013 | van Os | |
| 8,539,384 B2 | 9/2013 | Hinckley et al. | |
| 8,650,501 B2* | 2/2014 | Arnold et al. | 715/772 |
| 8,681,112 B2 | 3/2014 | Singhal | |
| 8,689,146 B2 | 4/2014 | Lazaridis et al. | |
| 8,711,416 B1 | 4/2014 | Byer et al. | |
| 8,726,198 B2 | 5/2014 | Rydenhag et al. | |
| 8,745,141 B2 | 6/2014 | Rosenberg et al. | |
| 8,756,257 B2* | 6/2014 | Szyperski et al. | 707/806 |
| 8,996,996 B2* | 3/2015 | Agarwal et al. | 715/723 |
| 2001/0028365 A1 | 10/2001 | Ludolph | |
| 2002/0098831 A1 | 7/2002 | Castell et al. | |
| 2002/0126155 A1* | 9/2002 | Lin-Hendel | 345/785 |
| 2003/0070000 A1 | 4/2003 | Coker et al. | |
| 2004/0068545 A1 | 4/2004 | Daniell et al. | |
| 2004/0117451 A1* | 6/2004 | Chung | 709/207 |
| 2004/0128353 A1 | 7/2004 | Goodman et al. | |
| 2004/0196259 A1* | 10/2004 | Bradski | 345/158 |
| 2004/0243677 A1 | 12/2004 | Curbow et al. | |
| 2005/0001848 A1* | 1/2005 | Colavin | 345/566 |
| 2005/0108655 A1* | 5/2005 | Andrea et al. | 715/798 |
| 2006/0026521 A1 | 2/2006 | Hotelling et al. | |
| 2006/0075046 A1 | 4/2006 | Yozell-Epstein et al. | |
| 2006/0101350 A1 | 5/2006 | Scott | |
| 2006/0123360 A1 | 6/2006 | Anwar et al. | |
| 2006/0156240 A1 | 7/2006 | Lemay et al. | |
| 2006/0190833 A1* | 8/2006 | SanGiovanni et al. | 715/767 |
| 2006/0250377 A1 | 11/2006 | Zadesky et al. | |
| 2006/0256082 A1 | 11/2006 | Cho et al. | |
| 2006/0270461 A1* | 11/2006 | Won et al. | 455/566 |
| 2006/0284852 A1 | 12/2006 | Hofmeister et al. | |
| 2007/0011258 A1* | 1/2007 | Khoo | 709/206 |
| 2007/0016958 A1 | 1/2007 | Bodepudi et al. | |
| 2007/0038718 A1* | 2/2007 | Khoo et al. | 709/206 |
| 2007/0083600 A1 | 4/2007 | Bakos et al. | |
| 2007/0106939 A1* | 5/2007 | Qassoudi | 715/704 |
| 2007/0139372 A1* | 6/2007 | Swanburg et al. | 345/156 |
| 2007/0150842 A1 | 6/2007 | Chaudhri et al. | |
| 2007/0152977 A1 | 7/2007 | Ng et al. | |
| 2007/0220444 A1* | 9/2007 | Sunday et al. | 715/788 |
| 2007/0236468 A1 | 10/2007 | Tuli | |
| 2007/0240042 A1* | 10/2007 | Sato | 715/527 |
| 2007/0256035 A1 | 11/2007 | Matsuzawa et al. | |
| 2007/0271376 A1* | 11/2007 | Yach | G06Q 10/107 709/224 |
| 2008/0005247 A9 | 1/2008 | Khoo | |
| 2008/0008163 A1 | 1/2008 | Castell et al. | |
| 2008/0034047 A1 | 2/2008 | Rosenberg et al. | |
| 2008/0034381 A1* | 2/2008 | Jalon et al. | 719/329 |
| 2008/0046824 A1* | 2/2008 | Li et al. | 715/739 |
| 2008/0065758 A1* | 3/2008 | Narayanaswami | G06Q 10/107 709/224 |
| 2008/0094369 A1 | 4/2008 | Ganatra et al. | |
| 2008/0165151 A1 | 7/2008 | Lemay et al. | |
| 2008/0165160 A1 | 7/2008 | Kocienda | |
| 2008/0174570 A1 | 7/2008 | Jobs et al. | |
| 2008/0189622 A1 | 8/2008 | Sanchez et al. | |
| 2008/0220747 A1* | 9/2008 | Ashkenazi et al. | 455/414.1 |
| 2008/0231601 A1 | 9/2008 | Fyke et al. | |
| 2008/0261569 A1 | 10/2008 | Britt et al. | |
| 2008/0272927 A1 | 11/2008 | Woolley et al. | |
| 2008/0273014 A1 | 11/2008 | Lowles et al. | |
| 2009/0006991 A1 | 1/2009 | Lindberg et al. | |
| 2009/0007017 A1* | 1/2009 | Anzures | G06F 3/04883 715/835 |
| 2009/0013282 A1* | 1/2009 | Mercer | 715/788 |
| 2009/0049407 A1* | 2/2009 | Casto | 715/828 |
| 2009/0064055 A1 | 3/2009 | Chaudhri et al. | |
| 2009/0094562 A1* | 4/2009 | Jeong et al. | 715/863 |
| 2009/0119678 A1 | 5/2009 | Shih et al. | |
| 2009/0144661 A1 | 6/2009 | Nakajima et al. | |
| 2009/0174679 A1 | 7/2009 | Westerman | |
| 2009/0177754 A1* | 7/2009 | Brezina et al. | 709/206 |
| 2009/0178006 A1 | 7/2009 | Lemay et al. | |
| 2009/0195518 A1 | 8/2009 | Mattice et al. | |
| 2009/0199130 A1 | 8/2009 | Tsern et al. | |
| 2009/0201316 A1* | 8/2009 | Bhatt | G06F 9/4443 345/660 |
| 2009/0210946 A1* | 8/2009 | Cohen | G06Q 30/0601 726/27 |
| 2009/0237367 A1 | 9/2009 | Ryu et al. | |
| 2009/0241072 A1 | 9/2009 | Chaudhri et al. | |
| 2009/0249247 A1* | 10/2009 | Tseng et al. | 715/808 |
| 2009/0252312 A1* | 10/2009 | Muniz | H04M 1/72547 379/112.01 |
| 2009/0267909 A1 | 10/2009 | Chen et al. | |
| 2009/0273583 A1 | 11/2009 | Norhammar | |
| 2009/0278806 A1* | 11/2009 | Duarte et al. | 345/173 |

(56) References Cited

U.S. PATENT DOCUMENTS

| | | | |
|---|---|---|---|
| 2009/0292690 A1* | 11/2009 | Culbert | 707/5 |
| 2009/0295753 A1* | 12/2009 | King et al. | 345/174 |
| 2009/0307622 A1* | 12/2009 | Jalon et al. | 715/765 |
| 2009/0307626 A1* | 12/2009 | Jalon et al. | 715/771 |
| 2009/0307631 A1* | 12/2009 | Kim et al. | 715/830 |
| 2009/0307710 A1 | 12/2009 | Zarzychi et al. | |
| 2010/0011304 A1 | 1/2010 | Van Os | |
| 2010/0013782 A1 | 1/2010 | Liu et al. | |
| 2010/0017695 A1 | 1/2010 | Palmieri | |
| 2010/0042954 A1 | 2/2010 | Rosenblatt et al. | |
| 2010/0050076 A1 | 2/2010 | Roth | |
| 2010/0058226 A1* | 3/2010 | Flake et al. | 715/786 |
| 2010/0060586 A1 | 3/2010 | Pisula et al. | |
| 2010/0066698 A1 | 3/2010 | Seo | |
| 2010/0079392 A1* | 4/2010 | Chiang et al. | 345/173 |
| 2010/0095224 A1 | 4/2010 | Yozell-Epstein et al. | |
| 2010/0095239 A1 | 4/2010 | McCommons et al. | |
| 2010/0107067 A1 | 4/2010 | Vaisanen et al. | |
| 2010/0153951 A1 | 6/2010 | Jones | |
| 2010/0156656 A1 | 6/2010 | Duarte et al. | |
| 2010/0162180 A1* | 6/2010 | Dunnam | G06F 3/04883 715/863 |
| 2010/0169722 A1 | 7/2010 | Wu et al. | |
| 2010/0171753 A1 | 7/2010 | Kwon | |
| 2010/0175018 A1* | 7/2010 | Petschnigg et al. | 715/776 |
| 2010/0178024 A1* | 7/2010 | Agarwal et al. | 386/52 |
| 2010/0182248 A1* | 7/2010 | Chun | G06F 3/041 345/173 |
| 2010/0185989 A1* | 7/2010 | Shiplacoff et al. | 715/856 |
| 2010/0211535 A1* | 8/2010 | Rosenberger | G06F 17/30038 706/20 |
| 2010/0214234 A1 | 8/2010 | Singhal | |
| 2010/0214237 A1 | 8/2010 | Echeverri et al. | |
| 2010/0218130 A1 | 8/2010 | Conrad et al. | |
| 2010/0231533 A1* | 9/2010 | Chaudhri | G06F 3/04817 345/173 |
| 2010/0235794 A1 | 9/2010 | Ording | |
| 2010/0248689 A1 | 9/2010 | Teng et al. | |
| 2010/0251178 A1 | 9/2010 | Lee et al. | |
| 2010/0289760 A1 | 11/2010 | Jonoshita et al. | |
| 2010/0295772 A1 | 11/2010 | Alameh et al. | |
| 2010/0302172 A1* | 12/2010 | Wilairat | 345/173 |
| 2010/0306693 A1 | 12/2010 | Brinda | |
| 2010/0306705 A1 | 12/2010 | Nilsson | |
| 2010/0317408 A1 | 12/2010 | Ferren et al. | |
| 2011/0029927 A1 | 2/2011 | Lietzke et al. | |
| 2011/0034208 A1 | 2/2011 | Gu et al. | |
| 2011/0061021 A1 | 3/2011 | Kang et al. | |
| 2011/0083111 A1 | 4/2011 | Forutanpour et al. | |
| 2011/0099490 A1 | 4/2011 | Barraclough et al. | |
| 2011/0112771 A1 | 5/2011 | French | |
| 2011/0163944 A1 | 7/2011 | Bilbrey et al. | |
| 2011/0163970 A1 | 7/2011 | Lemay | |
| 2011/0163989 A1 | 7/2011 | Singhal | |
| 2011/0167369 A1 | 7/2011 | van Os | |
| 2011/0175748 A1 | 7/2011 | Small et al. | |
| 2011/0175839 A1 | 7/2011 | Prabhu | |
| 2011/0181526 A1 | 7/2011 | Shaffer et al. | |
| 2011/0185318 A1 | 7/2011 | Hinckley et al. | |
| 2011/0209088 A1 | 8/2011 | Hinckley et al. | |
| 2011/0209097 A1 | 8/2011 | Hinckley et al. | |
| 2011/0209104 A1 | 8/2011 | Hinckley et al. | |
| 2011/0210983 A1 | 9/2011 | Theimer et al. | |
| 2011/0231499 A1 | 9/2011 | Stovicek et al. | |
| 2011/0252369 A1 | 10/2011 | Chaudhri | |
| 2011/0252381 A1* | 10/2011 | Chaudhri | G06F 3/04883 715/838 |
| 2011/0256848 A1 | 10/2011 | Bok et al. | |
| 2011/0294467 A1 | 12/2011 | Kim et al. | |
| 2012/0026194 A1 | 2/2012 | Wagner et al. | |
| 2012/0032979 A1 | 2/2012 | Blow et al. | |
| 2012/0069131 A1* | 3/2012 | Abelow | 348/14.01 |
| 2012/0083260 A1 | 4/2012 | Arriola et al. | |
| 2012/0084697 A1 | 4/2012 | Reeves | |
| 2012/0084698 A1 | 4/2012 | Sirpal et al. | |
| 2012/0084713 A1* | 4/2012 | Desai et al. | 715/788 |
| 2012/0090004 A1* | 4/2012 | Jeong | H04N 5/44513 725/39 |
| 2012/0102437 A1* | 4/2012 | Worley et al. | 715/863 |
| 2012/0105358 A1 | 5/2012 | Momeyer et al. | |
| 2012/0110087 A1* | 5/2012 | Culver et al. | 709/205 |
| 2012/0115449 A1 | 5/2012 | Bruchelt | |
| 2012/0154303 A1 | 6/2012 | Lazaridis et al. | |
| 2012/0159380 A1 | 6/2012 | Kocienda et al. | |
| 2012/0173993 A1* | 7/2012 | Chakra et al. | 715/752 |
| 2012/0180001 A1 | 7/2012 | Griffin et al. | |
| 2012/0192108 A1 | 7/2012 | Kolb | |
| 2012/0206392 A1 | 8/2012 | Ng et al. | |
| 2012/0210214 A1 | 8/2012 | Yoo et al. | |
| 2012/0226978 A1 | 9/2012 | Harberts et al. | |
| 2012/0235930 A1 | 9/2012 | Lazaridis et al. | |
| 2012/0236037 A1 | 9/2012 | Lessing et al. | |
| 2012/0266082 A1 | 10/2012 | Webber | |
| 2012/0280917 A1 | 11/2012 | Toksvig et al. | |
| 2012/0284673 A1 | 11/2012 | Lamb et al. | |
| 2012/0290946 A1 | 11/2012 | Schrock et al. | |
| 2012/0304107 A1* | 11/2012 | Nan et al. | 715/781 |
| 2012/0304108 A1 | 11/2012 | Jarrett | |
| 2012/0311444 A1 | 12/2012 | Chaudhri | |
| 2012/0326984 A1 | 12/2012 | Ghassabian | |
| 2013/0002524 A1 | 1/2013 | Sirpal et al. | |
| 2013/0007665 A1 | 1/2013 | Chaudhri et al. | |
| 2013/0024820 A1 | 1/2013 | Kirkpatrick | |
| 2013/0031515 A1 | 1/2013 | Funabashi et al. | |
| 2013/0033477 A1 | 2/2013 | Sirpal et al. | |
| 2013/0055170 A1 | 2/2013 | Langlois et al. | |
| 2013/0063383 A1 | 3/2013 | Anderssonreimer et al. | |
| 2013/0083260 A1 | 4/2013 | Minami | |
| 2013/0117689 A1 | 5/2013 | Lessing et al. | |
| 2013/0117718 A1 | 5/2013 | Lazaridis et al. | |
| 2013/0141371 A1 | 6/2013 | Hallford et al. | |
| 2013/0145295 A1 | 6/2013 | Bocking et al. | |
| 2013/0159941 A1 | 6/2013 | Langlois et al. | |
| 2013/0167066 A1 | 6/2013 | Scott | |
| 2013/0185650 A1 | 7/2013 | Gutowitz | |
| 2013/0187863 A1 | 7/2013 | Rydenhag et al. | |
| 2013/0187869 A1 | 7/2013 | Rydenhag et al. | |
| 2013/0191791 A1 | 7/2013 | Rydenhag et al. | |
| 2013/0321340 A1 | 12/2013 | Seo et al. | |
| 2013/0326401 A1 | 12/2013 | van Os | |
| 2013/0332886 A1 | 12/2013 | Cranfill et al. | |
| 2014/0011485 A1* | 1/2014 | Forstall et al. | 455/414.1 |
| 2014/0109020 A1 | 4/2014 | Wielgosz | |
| 2014/0111440 A1 | 4/2014 | Garside et al. | |
| 2014/0304657 A1* | 10/2014 | Biswas | G06T 13/80 715/838 |
| 2016/0366078 A1* | 12/2016 | Razavian | H04L 51/18 |
| 2016/0366079 A1* | 12/2016 | Razavian | H04L 51/18 |

FOREIGN PATENT DOCUMENTS

| | | |
|---|---|---|
| EP | 2015176 A1 | 1/2009 |
| EP | 2045700 | 4/2009 |
| EP | 2045700 A1 | 4/2009 |
| EP | 2068236 | 6/2009 |
| EP | 2068236 A1 | 6/2009 |
| EP | 2109030 | 10/2009 |
| EP | 2383636 A1 | 11/2011 |
| EP | 2458493 A3 | 5/2012 |
| EP | 2485138 A1 | 8/2012 |
| KR | 10-2008-0041809 A1 | 5/2008 |
| KR | 10-2009-0036578 A | 4/2009 |
| KR | 10-2010-0032660 A | 3/2010 |
| KR | 20100023637 | 3/2010 |
| TW | 201118666 | 6/2011 |
| WO | 2004051451 A2 | 6/2004 |
| WO | 2009097555 A2 | 8/2009 |
| WO | 2009120925 A2 | 10/2009 |
| WO | 2010040670 A1 | 4/2010 |
| WO | 2010110613 | 9/2010 |

(56) References Cited

FOREIGN PATENT DOCUMENTS

| WO | 2012097385 A2 | 7/2012 |
|---|---|---|
| WO | 2012128795 A1 | 9/2012 |

OTHER PUBLICATIONS

Office Action for related U.S. Appl. No. 13/607,330, dated Jan. 22, 2013, 27 pages.
http://www.evernote.com/peek/ Retrieved Aug. 27, 2012, 2 pages.
http://www.jimblackler.net/blog/?p=67/ "QuickCalendar, an application for Android written in Java" Retrieved Oct. 18, 2012, 6 pages.
http://www.support.apple.com/kb/HT3756/ "iOS: Understanding Notifications" Retrieved Oct. 18, 2012, 3 pages.
International Searching Authority, International Search Report and Written Opinion, issued for PCT/US2012/026970, mailed on Oct. 4, 2012, 10 pages.
Android Users Guide 2.3 (Google, Inc.) Dec. 13, 2010, see pp. 29-30, pp. 380. (English).
Android Users Guide 2.3 (Google, Inc.) Dec. 13, 2010, see pp. 27-28, pp. 368. (Korean).
"User Guide" Samsung Epic 4G, A Galaxy S Phone, Sprint Oct. 8, 2010, pp. 268.
Korean Office Action dated Jun. 20, 2013, issued in counterpart Korean Application No. 10-2012-0016518, 6 pages.
United States Patent and Trademark Office, "Notice of Allowance," issued is U.S. Appl. No. 13/607,330, mailed Nov. 7, 2013, 34 pages.
http://www.gigaom.com/2011/10/12/ios-5-notifications-and-notification-center/, Retrieved May 2, 2013, Asch, Josh, "iOS 5: Notifications and Notification Center", Tech News and Analysis, Oct. 12, 2011, four pages.
Office Action in related U.S. Appl. No. 13/607,330 issued Aug. 27, 2013, 34 pages.
Microsoft, "Cross Sliding State enumeration", internet article, http://msdn.microsoft.com.en-us/library/windows/apps/windows.ui.inout.crosslidingstate, retrieved Sep. 4, 2012, 3 pages.
Levesque et al., Frictional Widgets: Enhancing Touch Interfaces with Programmable Friction, published CHI 2011, ACM 978-1-4503-0268-5/11/05, May 7-12, 2011, 6 pages.
Canadian Intellectual Property Office, Office Action issued in connection with Canadian Application No. 2,768,287, dated Jan. 10, 2014, pp. 3.
Canadian Intellectual Property Office, Office Action issued in connection with Canadian Application No. 2,768,287, dated Oct. 14, 2014, 4 pages.
Office Action issued in Canadian Application No. 2,768,287 on Jul. 3, 2015; 7 pages.
Communication Pursuant to Article 94(3) EPC issued in EP Application No. 11156282.3 on Dec. 22, 2014; 8 pages.
Office Action issued in Chinese Application No. 201210043818.2 on Mar. 25, 2015; 7 pages.
Office Action issued in Canadian Application No. 2,768,287 on May 30, 2016; 4 pages.

\* cited by examiner

ELECTRONIC DEVICE AND METHOD OF DISPLAYING INFORMATION IN RESPONSE TO INPUT

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

The following describes an apparatus for and method of displaying information for a plurality of applications. While information for one application is displayed, a gesture is detected, and information for another application is displayed at an end of the original application. For example, while in an email application, when the gesture is detected, information associated with a calendar is displayed after the email application information is displayed. Thus, a user is provided with a quick way to open an additional application or preview information from the additional application without having to navigate to select an icon or enter a menu. The information may be displayed on any electronic device, including, for example, a portable electronic device.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, tablet computers, and so forth. The portable electronic device may also be a portable electronic device without wireless communication capabilities, such as a handheld electronic game device, digital photograph album, digital camera, or other device.

Figure 1:
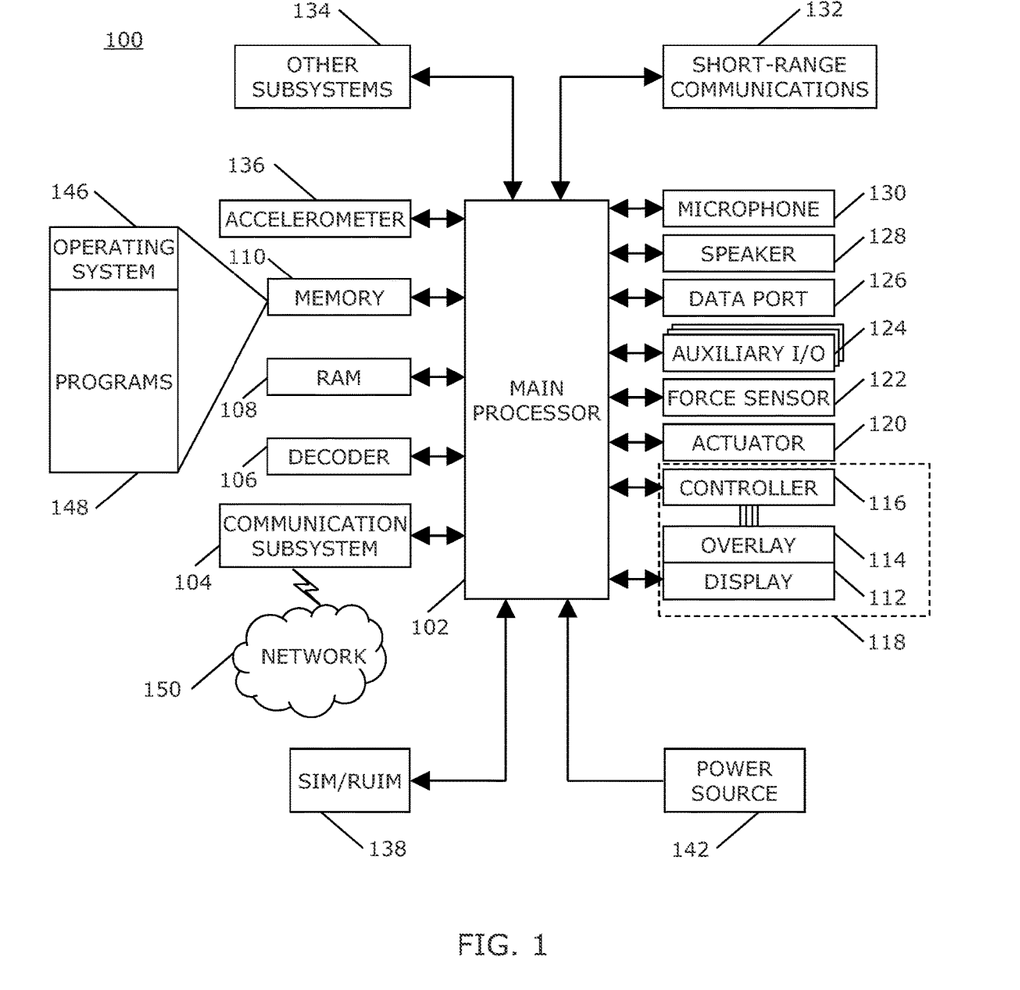
FIG. 1 is a block diagram of a portable electronic device in accordance with the disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably coupled to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable contact member, such as a finger, thumb, appendage, or other objects, for example, a stylus, pen, or other pointer, depending on the nature of the touch-sensitive display 118. Multiple simultaneous touches may be detected.

One or more actuators 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. The actuator may be any suitable actuator, including mechanical and/or electrical actuators.

Figure 2:
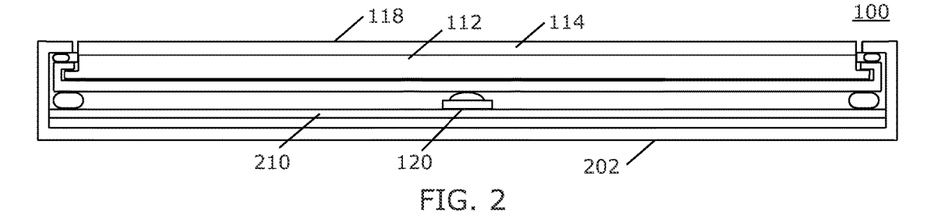
FIG. 2 is a sectional side view of a portable electronic device with a mechanical actuator in accordance with the disclosure.

A sectional side view of a portable electronic device 100 with a mechanical actuator 120 is shown in FIG. 2. The cross section is taken through the center of the actuator 120. The portable electronic device 100 includes a housing 202 that encloses components such as shown in FIG. 1. A base 210 extends between the sidewalls of the housing and supports the actuator 120, which is a mechanical dome switch actuator in the example of FIG. 2. For a mechanical dome switch/actuator, tactile feedback is provided when the dome collapses due to imparted force and when the dome switch/actuator returns to the rest position after release of the switch.

Figure 4:
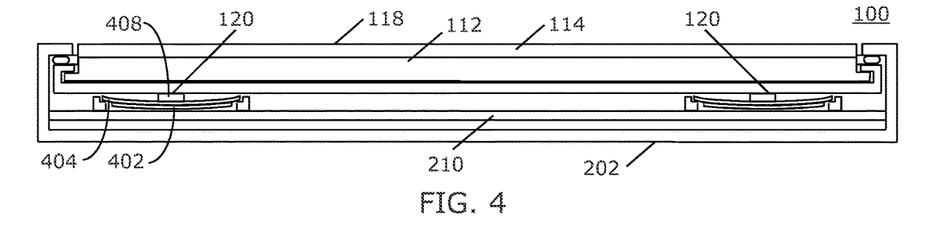
FIG. 4 is a sectional side view of a portable electronic device with piezoelectric actuators in accordance with the disclosure.

Alternatively, the actuator 120 may comprise one or more piezoelectric (piezo) devices 402 that provide tactile feedback for the touch-sensitive display 118. Contraction of the piezo actuator 120 applies a spring-like force, for example, opposing a force externally applied to the touch-sensitive display 118. Each piezo actuator includes a piezoelectric device 402, such as a piezoelectric ceramic disk adhered to a substrate 404 that may comprise metal and/or another flexible or elastically deformable material. The substrate 404 bends when the piezo device 402 contracts due to charge/voltage across the piezo device 402 or in response to a force, such as an external force applied to the touch-sensitive display 118. The charge/voltage may be adjusted by varying the applied voltage or current, thereby controlling the force applied by the piezo device 402. The charge/voltage may advantageously be removed over a relatively short period of time to provide tactile feedback. An element 408 and an optional force sensor 122 may be disposed between the piezo actuator 402 and the touch-sensitive display 118 to facilitate actuation of the piezo actuator and/or the optional force sensors 122. The piezo actuators 120 may be controlled to provide various forms of tactile feedback, for example, a vibration to notify of an incoming call or text message or simulation of a dome switch upon depression of the touch-sensitive display 118.

Figure 3:
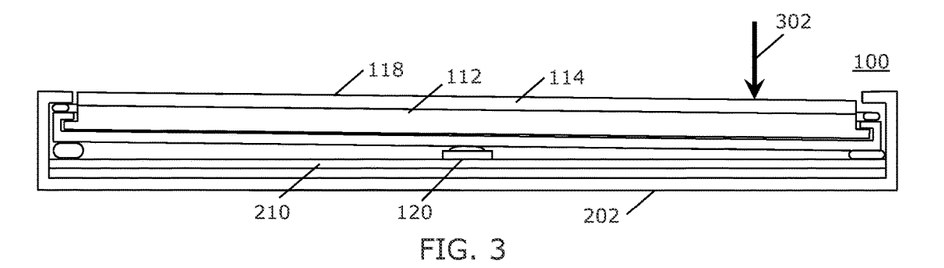
FIG. 3 is a sectional side view of a portable electronic device with a depressed mechanical actuator in accordance with the disclosure.
Figure 5:
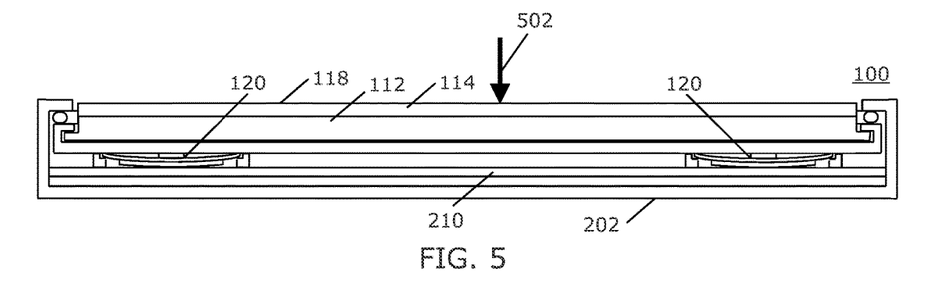
FIG. 5 is a sectional side view of a portable electronic device with depressed piezoelectric actuators in accordance with the disclosure.

The touch-sensitive display 118 is moveable and depressible with respect to the housing 202, and is shown floating with respect to, i.e., not fastened to, the housing 202 in the examples of FIG. 2 through FIG. 5. As the touch-sensitive display 118 moves toward the base 210, the actuator 120 is depressed or actuated as shown in FIG. 3 and FIG. 5, for example, in response to a force 302, 502 applied to the touch-sensitive display 118. The processor 102 receives a signal when the actuator 120 is depressed or actuated, which signal may trigger a selection or other input to the portable electronic device 100.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming. Force as utilized throughout the specification, including the claims, refers to force measurements, estimates, and/or calculations, such as pressure, deformation, stress, strain, force density, force-area relationships, thrust, torque, and other effects that include force or related quantities.

Typically, when a user views information while in an application on a portable electronic device 100, information for that application alone is displayed in the window, also known as a field, where the application is open or launched. As described below, that same window may be utilized to at least temporarily display information from one or more additional sources or applications. Given the relatively small area available for display on a portable electronic device 100, the window is typically the display area, except for area that may be utilized as a header, a footer, and so forth. Unlike larger computer monitors, viewing information on existing portable devices for two applications is typically performed by displaying one application at a time due to the smaller display size. As described below, the same window or display area may be utilized to continuously view information from multiple sources, such as applications. For example, while received emails are displayed, a user may need to view future actions, such as calendar events or tasks. When an appropriate input, such as a gesture is received, upcoming calendar events may be viewed continuously with the emails as described below. For example, emails displayed with the most recently received email on top may be viewed effectively continuously with the nearest calendar event displayed on the bottom or nearest to the most recently received email. Information from multiple sources or applications may be displayed in a single window or field, where information may be combined in a useful manner, such as by time, by contact, by other parameter or category, and so forth. For example, a single stream of information can be viewed in chronological order, with the future actions being optionally selected for viewing.

Figure 6:
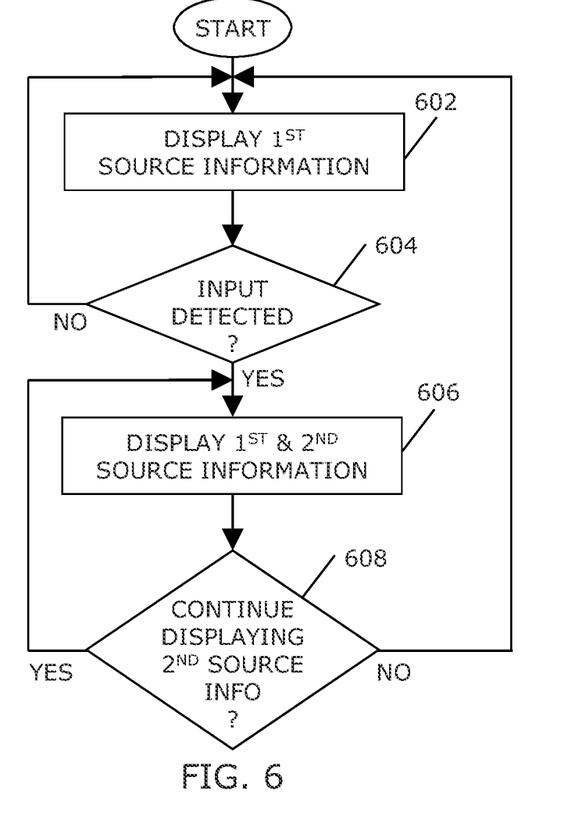
FIG. 6 is a flowchart illustrating a method of displaying information for a plurality of applications in accordance with the disclosure.

A flowchart illustrating a method of displaying information for a plurality of applications of an electronic device is shown in FIG. 6. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium.

Information associated with a first source, such as a first application, referred to as first information, is displayed 602 on a display, for example, on a touch-sensitive display 118. The information may be information associated with any suitable source or application, such as email, text messaging, calendar, tasks, address book or contacts, media player, or any other suitable application in which information is displayed by an electronic device 100. Information associated with email may include a list of email messages, information associated with a calendar may include meeting schedule, calendar day view, week view, month view, or agenda view, information associated with an address book may include a listing of contacts, information associated with a media player may include text, pictures, videos, or artwork related to music or other media. The information is not limited to the examples provided.

An input, such as a gesture, is detected 604. Detection of the input triggers display of information for a second source, such as a second application. The second application may be any suitable application, such as described above. The information associated with the second application is also described above. The input may be considered to be a command associated with a second application, which command requests or causes at least some information associated with the second source or application to be displayed.

Figure 7:
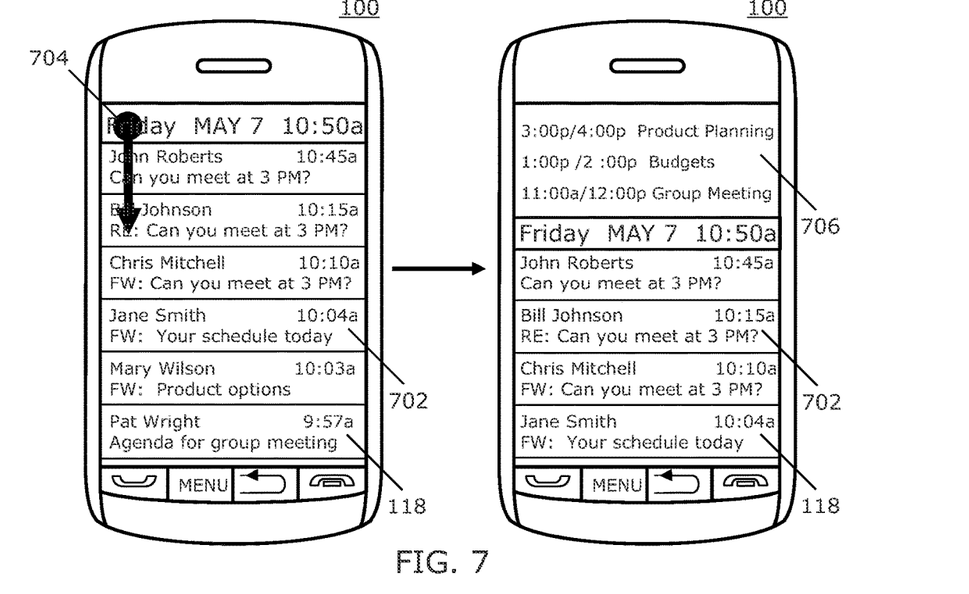
FIG. 7, FIG. 8, FIG. 9, FIG. 10, and FIG. 11 illustrate examples of displaying information for a plurality of applications in accordance with the disclosure.

An appropriate input is advantageously assigned as the input such that unintentional display of information associated with the second source or application is avoided. Thus, the input, such as a gesture, is associated with the second source or application. The input may be associated with a specific location, such as a side or corner of the touch-sensitive display 118, or a displayed element, such as a special indicator, e.g., a ghosted symbol or word, or a header for an application, e.g., the header "FRIDAY May 7 10:50a" as shown in FIG. 7, and end of the displayed information associated with the first application, and so forth. The input may be a gesture having detectable attributes or characteristics, such as movement, direction, change in direction, shape, duration, length, force, speed, time associated with a given location as with a hover, number of simultaneous touch locations, number of taps, use in conjunction with a physical key, button, or other input device, and so forth. The input may be depression of a touch-sensitive display 118 that actuates an actuator 120, such as described above. The input may be provided while any end of the information associated with the first application is displayed. The input may be provided by selection from a menu. The input may be any combination of the above.

Figure 9:
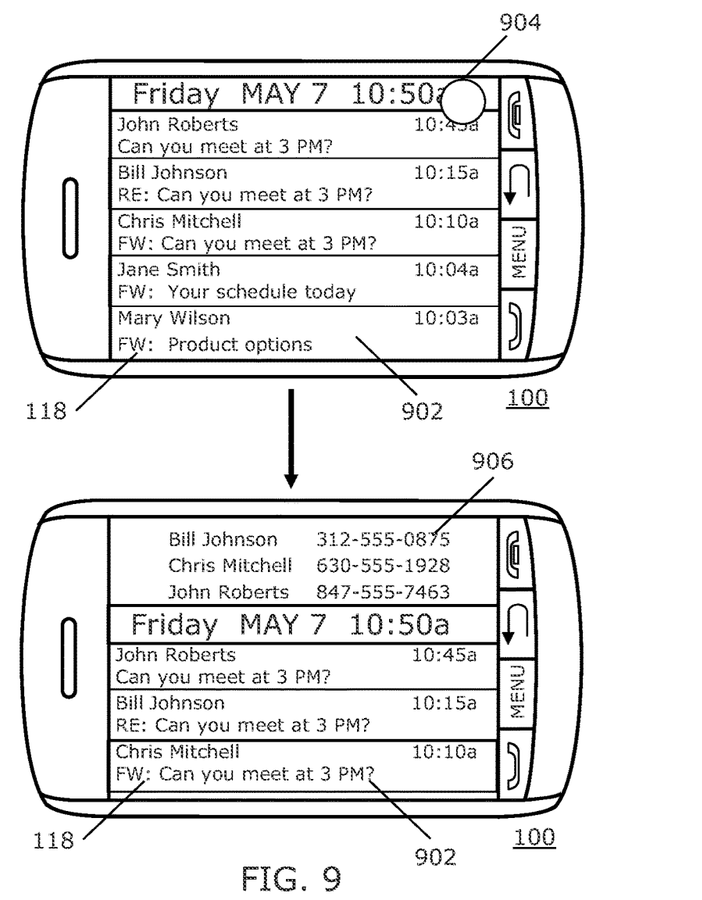
Figure 10:
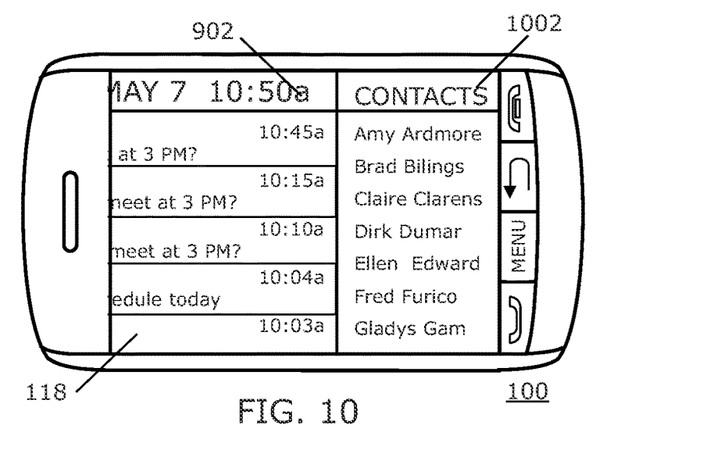

A few examples of an input are as follows. The input may be a gesture that extends substantially from one end of the display 118 to an opposite end of the display 118, such the swipe 804 shown in FIG. 8. The gesture may alternatively move across the narrow part of the display 118, e.g., at a right angle to the swipe 804 shown in FIG. 8. The input may be a hover or other gesture that remains associated with a specific location for a period of time, such as the sustained touch 904 at a location associated with a corner of the touch-sensitive display 118 where part of the header for the email application is displayed as shown in the example of FIG. 9. The input, such as a gesture, may be provided while any end of the information associated with the first application is displayed. The input may be associated with any end of the first information, such as the beginning of the information, the last part of the information, or a side of the information, such as the left side or right side of the displayed information, such as shown in FIG. 10. The input may be a compound gesture, for example, a touch sustained at a specific location, such as a corner or side of the display, while a swipe is detected. When the input is a gesture, the gesture need not be limited to a gesture input via an input device, e.g., a touch-sensitive display, optical joystick, and so forth, but may include other types of gestures such as 3D gestures or physical gestures involving movement of the electronic device 100.

Information associated with the second source, such as an application, referred to as second information, is displayed 606. The second information may be displayed at any end of the first information. For example, the second information may be displayed at the end of the first information that is displayed when the gesture is detected 604. In another example, the second information may be displayed at the end of the first information that is associated with the gesture, such as the left or right side of the display, such as shown in FIG. 10. The second information may be scrolled through after scrolling through the first information. For example, when a swipe begins on the display 118 and proceeds at least to any end of the display 118, the first information and the second information may be scrolled through substantially contiguously. Thus, both the first information and the second information may be displayed in a continuous stream of information, and information for two or more applications may be displayed at the same time. The second information may be displayed in any order, including chronological, reverse chronological, alphabetical, reverse alphabetical, most often accessed, and so forth. The information from two or more sources, such as applications, may be combined and displayed, rather than appending the information together.

The second information may be a preview of information, e.g., a subset of all the second information. For example, when the second application is email, the last five emails may be displayed, when the second application is an address book, the ten most often accessed contacts may be displayed, and so forth. The preview may be displayed without opening or launching the second application, in which case the previewed information may be retrieved from stored information and/or information received via a communication network 150. Alternatively, the second application may be launched or opened upon detection of the gesture.

The second information may continue 608 to be displayed, including scrolled through, as long as any second information remains on the display 112. For example, after all the second information has scrolled off the display 112, the first information, and not the second information, is displayed until a subsequent detection of an appropriate input, such as a gesture described above. In other words, when the input is not detected, scrolling through the first information stops when the end of the information is displayed, e.g., at an end of the display 112.

The second information may continue to be displayed for a predetermined time period, such as 5 or 10 seconds, which time period may be selected by a user and stored in a user profile. Second information may alternatively be discontinued 608 when an input, similar to or dissimilar to the gesture at 604, is detected. For example, if a clockwise circular gesture triggers display of the second information, a counterclockwise circular gesture may discontinue display of the second information.

The present method may optionally be applied to two or more applications in addition to the first application. For example, once the second information is scrolled through, information associated with a third application may be displayed upon detection of an appropriate input, much the same way the second information is displayed when an input is detected during display of first information. Any number of applications may be displayed by repeating the process. For example, a long swipe during display of first information results in display of second information, and a second long swipe during display of the second information results is display of third information. Alternatively, a single input may display information from any number of sources or applications.

Alternatively, a different application may be associated with different ends of the information. For example, a gesture associated with the newest displayed emails may result in display of calendar information, a gesture associated with the oldest displayed emails may result in display of an address book, a gesture associated with the left side of the displayed emails may result in display of tasks, and a gesture associated with the right side of the displayed emails may result in display of media player controls.

A user profile may be utilized to store various options associated with the method, which options may be selected by a user. For example, a user may select which application opens when information for a given application is displayed. When multiple applications are opened or multiple sources of information are accessed, the order of the applications or sources may be stored. Applications associated with different ends of any source or application may be selected and stored. The input that triggers secondary source or application display may be selected and stored, for example, a hover, a swipe, a circle gesture, and so forth. A time duration for detection of a gesture may be stored in the profile. Time of display of the second information may be selected by the user and stored. How much information is displayed from a second source or application may be stored and selected, e.g., how many emails, contacts, logged phone calls, and so forth. When a second (which may be opened later than the first application) application is previewed or opened or launched. Options related to how the information is displayed may be included in the profile, including end-to-end display, combination of sources, order of combined sources such as chronological or time order, and so forth. Any other information related to the method may optionally be selected and stored in the user profile.

Examples of displaying information for a plurality of applications are shown in FIG. 7, FIG. 8, FIG. 9, FIG. 10, and FIG. 11. Although these examples show information displayed for an email application when the input is detected, any application may be displayed. While email application information 702 is displayed in FIG. 7, an input comprising a downward swipe 704 that begins at the end of the email information causes calendar information 706 to be displayed at that end of the email information.

Figure 8:
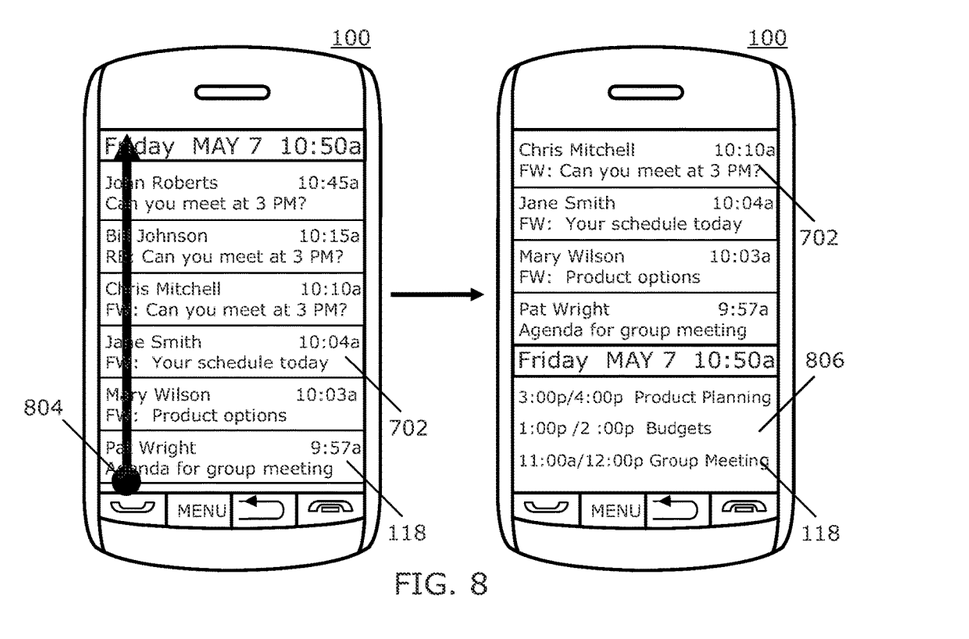

While email application information 702 is displayed in FIG. 8, an input comprising an upward swipe 804 that begins at the bottom end of the touch-sensitive display 118 and ends at the opposite end of the touch-sensitive display 118 causes calendar information 806 to be displayed at that end of the email information, which is the bottom end of the email information in this example.

The method may be applied when information displayed in either portrait, such as shown in FIG. 7 and FIG. 8, or landscape orientations, such as shown in FIG. 9 and FIG. 10. While email application information 902 is displayed in FIG. 9, an input comprising a sustained touch 904, also referred to as a hover, is detected at a location associated with a corner of the display where a header for email information is displayed. Contact information 906 is displayed at that end of the email information.

While email application information 902 is displayed in FIG. 10, an input, such as a gesture associated with the right side of the display is detected, and contact information 1002 is displayed at right side of the display. FIG. 10 shows the transition from display of emails to display of contacts.

Figure 11:
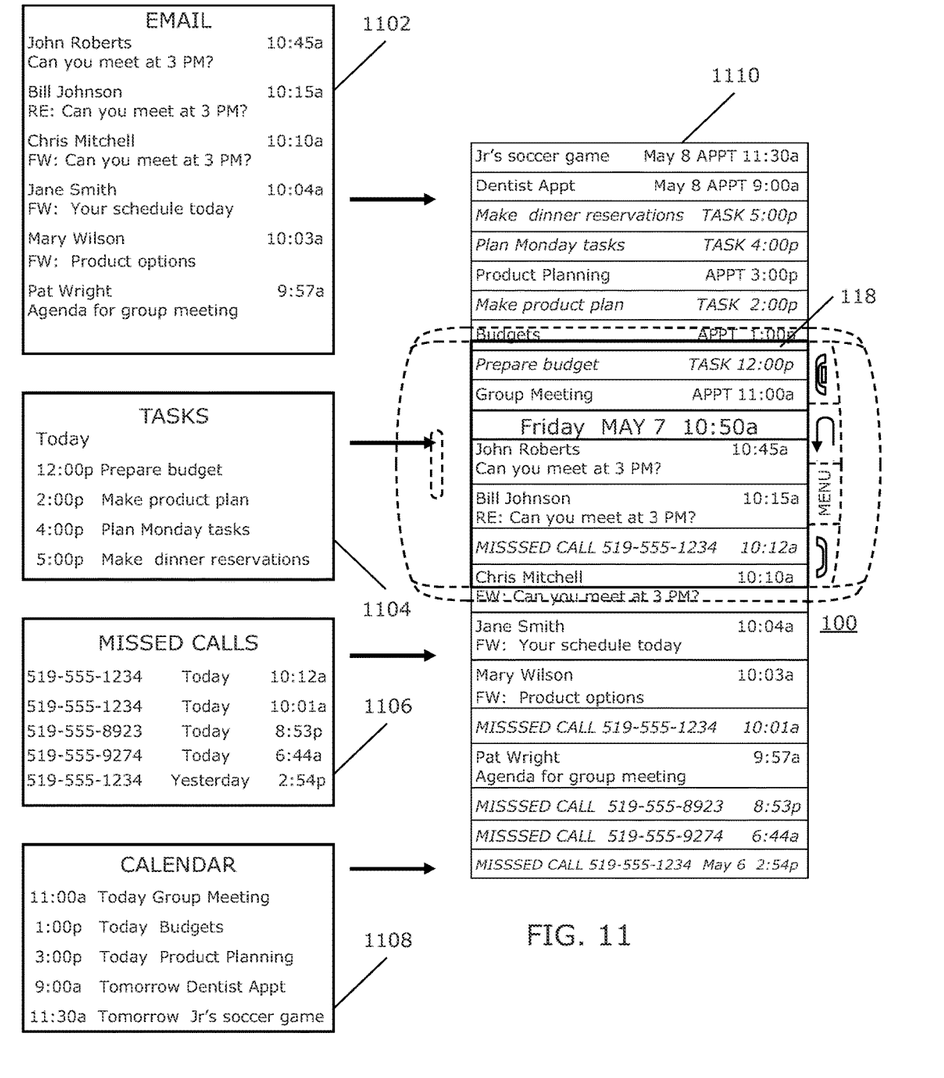

Alternatively, information may be displayed in a combined manner, such that information from two or more sources is combined and displayed. An example is shown in FIG. 11, which illustrates combination of information from four different sources, email, tasks, missed calls, and calendar. For example, in order to respond to John Roberts 10:45 AM email asking whether a user can meet at 3 PM, the user may need information from multiple sources, such as the calendar, task list, and missed calls, to answer the question. Existing portable devices typically require the user to separately open an application for each of these sources, requiring numerous steps and time.

As shown in FIG. 11, information associated with four sources or applications, email 1102, tasks 1104, missed calls 1104, and calendar 1108, is combined into a single list or grouping of information 1110 that is displayed. The portable electronic device 118 is shown in dashed lines to more clearly illustrate the list of information 1110. When the information 1110 is displayed in one window or field of the display 118, the list may advantageously be scrolled through. The list may be referred to as an extended list or extended message list. The information may optionally be combined according to a parameter, such chronological or time order, for further advantage, such as shown in FIG. 11. The user is provided with a combined list of information that is easily scrolled through to determine and answer to the question from John's email. Further, the user is provided with the ability to reply to the email from the same list of information. Optionally, the portable electronic device 100 need not launch or open the applications associated with the tasks, missed calls, or calendar. This information may be obtained, for example, from information stored on the portable electronic device 100.

Optionally, formatting of information on the extended list may be provided to provide more easily identifiable information. For example, different sources of information may have different formatting, such as italicizing, shading, highlighting, coloring, and so forth. For example, the missed calls and tasks are italicized in the extended list 1110 of FIG. 11. Dates may optionally be added to the list when information is associated with multiple dates. For example, May 8 is added to the appointments at the top of the list 1110 and May 6 is added to the missed call at the bottom of the list 1108. The current date and time may be displayed at a point in a chronological list where the current time and date fit chronologically, such as shown in FIG. 11. Display of current date and time more easily identifies the separation of past and future items in the list 1110.

A method comprises displaying in a window or field first information associated with a first source running on a portable electronic device, detecting an input to display second information associated with a second source, and displaying second information associated with the second source and the first information in the window or field.

A method comprises prior to detecting an input, displaying information from a first source in a window or field of a portable electronic device, detecting the input on the portable electronic device, subsequent to detecting the input, displaying information from two or more sources including the first source in the window or field. The information from the two or more sources may include information pertaining to at least one future event. The information from the two or more sources may be combined and displayed in chronological order. The input may be a gesture requesting display of at least some information associated with a source of information other than the first source.

Although a touch-sensitive display is described in the above examples as the input device for gestures, other touch-sensitive input devices, such as optical joysticks, optical trackpads, trackballs, other navigation devices, and so forth, may be utilized.

The present method and electronic device make opening or display of information associated with a second application quicker, because the user need not navigate to a home page or open multiple applications to view information from multiple sources, such as multiple applications. Further, the user need not switch between multiple applications and/or windows to perform a task, such as replying to an email with scheduling information or phone numbers, because all the information may be displayed, for example, in response to a simple gesture. Information related to both past information, such as emails and missed phone calls, and future events, such as calendar items or tasks, may be viewed in a single field or window without having to switch between windows or applications. All displayed information may be displayed chronologically or by another order among the information from at least two applications. Information from multiple sources may be scrolled through in a single list.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method for temporarily viewing calendar information from within a display of message data in a messaging application on an electronic device, the method comprising:
    displaying, in a messaging application window generated by the messaging application, the message data including a list of messages in a chronological order and a header at a first end of the list of messages indicating a date associated with the first end of the list of messages;
    detecting a swipe gesture requesting combined temporary display of the message data and the calendar information, the swipe gesture starting on the header and swiping through at least a portion of the displayed list of messages;
    selecting the calendar information based on a chronological correlation between the calendar information and the date associated with the first end of the list of messages being displayed;
    appending, by the messaging application, the calendar information to the first end of the message data by maintaining at least some of the messages in the list of messages in the messaging application window and temporarily displaying the calendar information in a portion of the messaging application window, separated from the at least some of the messages by the header, wherein the combined display of the calendar information and the list of messages is scrollable as a single list; and
    once the calendar information is scrolled off the display, removing the temporarily appended calendar information from the single list and scrolling through the message data without displaying the calendar information until a subsequent detection of the swipe gesture.

2. The method of claim 1, wherein the calendar information is scrolled through after scrolling through the message data.

3. The method of claim 1, wherein a calendar application is not launched upon detection of the gesture.

4. A computer-readable device having computer-readable code executable by at least one processor of a portable electronic device to perform the method of claim 1.

5. An electronic device to temporarily view calendar information from within a messaging application displaying message data on the electronic device, comprising:
    a display;
    a processor configured to:
        display, in a first messaging window generated by the messaging application on the display, the message data including a list of messages in a chronological order and a header at a first end of the list of messages indicating a date associated with the first end of the list of messages;
        detect, by the electronic device, a swipe gesture requesting combined temporary display of the message data and the calendar information, the swipe gesture starting on the header and swiping through at least a portion of the displayed list of messages;
        select the calendar information based on a chronological correlation between the calendar information and the date associated with the first end of the list of messages being displayed;

temporarily append the calendar information to the first end of the message data by maintaining at least some of the messages in the list of messages in the messaging application window and temporarily displaying the calendar information in a portion of the messaging application window, separated from the at least some of the messages by the header, wherein the combined display of the calendar information and the list of messages is scrollable as a single list; and once the calendar information is scrolled off the display, remove the temporarily appended calendar information from the single list and scroll through the message data without displaying the calendar information until a subsequent detection of the swipe gesture.

6. A method for temporarily viewing calendar information from within a display of message data in a messaging application on an electronic device, the method comprising:

displaying, in a first window generated by the messaging application, the message data including a list of messages in a chronological order and a header at a first end of the list of messages indicating a date associated with the first end of the list of messages;

detecting a first input requesting display of the calendar information associated with a calendar application, the first input starting on the header and swiping through at least a portion of the displayed list of messages;

selecting the calendar information based on a chronological correlation between the calendar information and the date associated with the first end of the list of messages being displayed;

displaying, within the first window, the calendar information at the first end of the message data by maintaining at least some of the messages in the list of messages in the messaging application window and temporarily displaying the calendar information appended to the first end in a portion of the messaging application window, separated from the at least some of the messages by the header, wherein the combined display of the calendar information and the list of messages is scrollable as a single list; and detecting a second input requesting display of third information associated with a third source;

displaying, within the first window, the third information at the second end of the message data, such that the message data and the third information are displayed side-by-side;

once the calendar information is scrolled out of the first window, removing the calendar information from the single list and scrolling through the message data without displaying the calendar information until a subsequent detection of the first input; and once the third information is scrolled out of the first window, removing the third information from the second end of the message data and scrolling through the message data without displaying the third information until a subsequent detection of the second input.

7. A computer-readable device having computer-readable code executable by at least one processor of a portable electronic device to perform the method of claim 6.

8. A method for temporarily viewing calendar information from within a display of message data in a messaging application on an electronic device, the method comprising:

displaying, in a window or field generated by the messaging application, the message data without displaying the calendar information, the message data including a list of messages in a chronological order and a header at a first end of the list of messages indicating a date associated with the first end of the list of messages;

detecting, by the electronic device, an input to display the calendar information, the input starting on the header and swiping through at least a portion of the displayed list of messages;

selecting the calendar information based on a chronological correlation between the calendar information and the date associated with the first end of the list of messages being displayed;

temporarily appending, by the first application, the calendar information to the first end of the message data by maintaining at least some of the messages in the list of messages in the messaging application window and temporarily displaying the calendar information in a portion of the messaging application window, separated from the at least some of the messages by the header, wherein the combined display of the calendar information and the list of messages is scrollable as a single list without entering a menu and without selecting an icon associated with the calendar information; and once the calendar information is scrolled out of the window or field, removing the calendar information from the single list and scrolling through the message data without displaying the calendar information until a subsequent detection of the input.

9. A method for temporarily viewing calendar information from within a display of message data in a messaging application on an electronic device, the method comprising:

prior to detecting an input, displaying, by the messaging application running on an electronic device, the message data in a window or field generated by the messaging application without displaying the calendar information in the window or field, the message data including a list of messages in a chronological order and a header at a first end of the list of messages indicating a date associated with the first end of the list of messages;

detecting, by the electronic device, the input while the calendar information is not displayed, the input starting on the header and swiping through at least a portion of the displayed list of messages;

in response to detecting the input:
  selecting the calendar information based on a chronological correlation between the calendar information and the date associated with the first end of the list of messages being displayed;
  temporarily appending the calendar information to the first end of the message data by maintaining at least some of the messages in the list of messages in the messaging application window and temporarily displaying the calendar information in a portion of the messaging application window, separated from the at least some of the messages by the header, wherein the combined display of the calendar information and the list of messages is scrollable as a single list without navigating to the second application; and
  once the calendar information is scrolled out of the window or field, removing the calendar information from the single list and scrolling through the message data without displaying the calendar information until a subsequent detection of the input.

10. The method of claim 9, wherein the single list includes information pertaining to at least one future event.

11. The method of claim 9, wherein the single list is displayed in chronological order.

* * * * *